United States Patent
Short et al.

(10) Patent No.: US 10,216,075 B2
(45) Date of Patent: Feb. 26, 2019

(54) DIGITAL LIGHT PROJECTOR HAVING INVISIBLE LIGHT CHANNEL

(71) Applicant: Hewlett-Packard Development Company, L.P., Houston, TX (US)

(72) Inventors: David Bradley Short, San Diego, CA (US); Robert L Mueller, San Diego, CA (US); Jinman Kang, San Diego, CA (US); Otto Sievert, Oceanside, CA (US); Kurt Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/511,035

(22) PCT Filed: Sep. 15, 2014

(86) PCT No.: PCT/US2014/055649
§ 371 (c)(1),
(2) Date: Mar. 14, 2017

(87) PCT Pub. No.: WO2016/043704
PCT Pub. Date: Mar. 24, 2016

(65) Prior Publication Data
US 2017/0277028 A1   Sep. 28, 2017

(51) Int. Cl.
*G03B 21/14* (2006.01)
*H04N 9/31* (2006.01)
(Continued)

(52) U.S. Cl.
CPC .......... *G03B 21/20* (2013.01); *G01B 11/2513* (2013.01); *G03B 17/54* (2013.01);
(Continued)

(58) Field of Classification Search
CPC .... H04N 13/02; H04N 13/0257; H04N 13/04; H04N 13/042; H04N 13/045;
(Continued)

(56) References Cited

U.S. PATENT DOCUMENTS 7,182,465 B2   2/2007  Fuchs et al.
7,599,561 B2  10/2009  Wilson et al.
(Continued)

FOREIGN PATENT DOCUMENTS

EP        2722656     4/2014
JP    2010-081001 A   4/2010
(Continued)

OTHER PUBLICATIONS

Fu et al, "Robust Near-infrared Structured Light Scanning for 3D Human Model Reconstruction," University of Kentucky, SPIE MOEMS-MEMS 2014, pp. 1-6.
(Continued)

*Primary Examiner* — William C Dowling
(74) *Attorney, Agent, or Firm* — Dicke Billig & Czaja (57) ABSTRACT

A digital light projector having a plurality of color channels including at least one visible color channel providing visible light and at least one invisible color channel providing invisible light. The digital light projector including a projecting device projecting light from the plurality of color channels onto an environment in the form of an array of pixels which together form a video image including a visible image and an invisible image, the video image comprising a series of frames with each frame formed by the array of pixels, wherein to form each pixel of each frame the projecting device sequentially projects a series of light pulses from light provided by each of the plurality of color channels, with light pulses from the at least one visible color channel forming the visible image and light pulses from the (Continued)

at least one invisible color channel forming the invisible image.

20 Claims, 6 Drawing Sheets

(51) Int. Cl.
    *G03B 21/20*     (2006.01)
    *G03B 17/54*     (2006.01)
    *G03B 21/26*     (2006.01)
    *G01B 11/25*     (2006.01)
    *G06T 7/521*     (2017.01)
    *G06T 7/55*     (2017.01)

(52) U.S. Cl.
    CPC .............. *G03B 21/26* (2013.01); *G06T 7/521* (2017.01); *G06T 7/55* (2017.01); *G03B 21/2033* (2013.01); *G06T 2207/10024* (2013.01); *G06T 2207/10028* (2013.01); *G06T 2207/10048* (2013.01); *H04N 9/3111* (2013.01); *H04N 9/3123* (2013.01)

(58) Field of Classification Search
    CPC .... H04N 13/00; H04N 9/3123; H04N 9/3111; H04N 9/3164; G03B 35/22; G03B 21/008; G03B 21/2033; G02B 27/22
    See application file for complete search history.

(56) References Cited

U.S. PATENT DOCUMENTS

| | | | |
|---|---|---|---|
| 7,710,391 | B2 | 5/2010 | Bell et al. |
| 8,121,640 | B2 | 2/2012 | Russ et al. |
| 8,199,117 | B2 | 6/2012 | Izadi et al. |
| 8,570,372 | B2 | 10/2013 | Russell |
| 8,736,583 | B2 | 5/2014 | Anderson et al. |
| 8,760,499 | B2* | 6/2014 | Russell .............. H04N 13/0203 348/46 |
| 9,033,521 | B2* | 5/2015 | Chen .................. G03B 21/2066 353/102 |
| 2005/0078092 | A1 | 4/2005 | Clapper |
| 2008/0018591 | A1 | 1/2008 | Pittel et al. |
| 2011/0063574 | A1 | 3/2011 | Freeman |
| 2011/0175983 | A1* | 7/2011 | Park ...................... G03B 35/08 348/46 |
| 2011/0242054 | A1 | 10/2011 | Tsu |
| 2012/0229606 | A1 | 9/2012 | Rodrigue et al. |
| 2013/0077236 | A1 | 3/2013 | Becze et al. |
| 2013/0215235 | A1 | 8/2013 | Russell |
| 2014/0132730 | A1 | 5/2014 | Blayvas |
| 2017/0054966 | A1* | 2/2017 | Zhou .................. H04N 13/0271 |

FOREIGN PATENT DOCUMENTS

| | | |
|---|---|---|
| JP | 2011-199570 A | 10/2011 |
| JP | 2012058581 | 3/2012 |
| KR | 10-2014-0053647 A | 5/2014 |
| TW | 200500781 | 1/2005 |
| WO | WO-2013/102398 A1 | 7/2013 |
| WO | WO-2013111376 | 8/2013 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

\* cited by examiner

DIGITAL LIGHT PROJECTOR HAVING INVISIBLE LIGHT CHANNEL

BACKGROUND

In addition to projecting images for display, digital light projectors can perform 3D object scanning by employing structured or patterned light scanning techniques. According to such techniques, a known pattern of pixels, such as stripes, bars, or grids, for example, is projected onto a scene or environment. When viewed from a perspective other than that of the projector, the pattern is geometrically distorted due to the surface shapes of the environment. The distorted pattern(s) are captured by sensors, such as cameras, for example, and are used to determine 3D coordinates of the environment and enable a geometric reconstruction of the surface shapes.

DETAILED DESCRIPTION

In the following detailed description, reference is made to the accompanying drawings which form a part hereof, and in winch is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Structured or patterned light scanning is a recognized technique for measuring the three-dimensional shape of objects and surfaces in a scanned environment. Structured light scanning includes a known pattern of pixels, such as stripes, bars, or grids, for example, onto a scene or environment. When viewed from a perspective other than the projector, the pattern is geometrically distorted due to the surface shapes of the environment onto which the pattern is projected. The distorted pattern(s) are captured by sensors, such as cameras, for example, with 3D coordinates of the environment being determined from the captured images and enabling as 3D geometric reconstruction of object and surface shapes in the scanned environment.

Digital light projectors (DLPs) can be employed for such scanning by projecting visible light patterns onto an object or environment to be scanned. Such scanning is employed by DLPs for various purposes, such as, for example, to provide color scanning of 3D objects, or to provide depth information of a projection surface so that pixels can be "pre-distorted" in order for projected images to appear undistorted even when projected on uneven surfaces.

Because the projected patterned light can be visually unappealing or can detract from or interfere with other projected images, some DLP systems employ invisible light (i.e. imperceptible to human vision), such as infrared light, for example, to project structured light patterns. However, in order to project both a user or display image and structured light patterns, such DLP systems employ two separate projectors—a visible light projector for the user or display image and an infrared projector for the structures light patterns.

Figure 1:
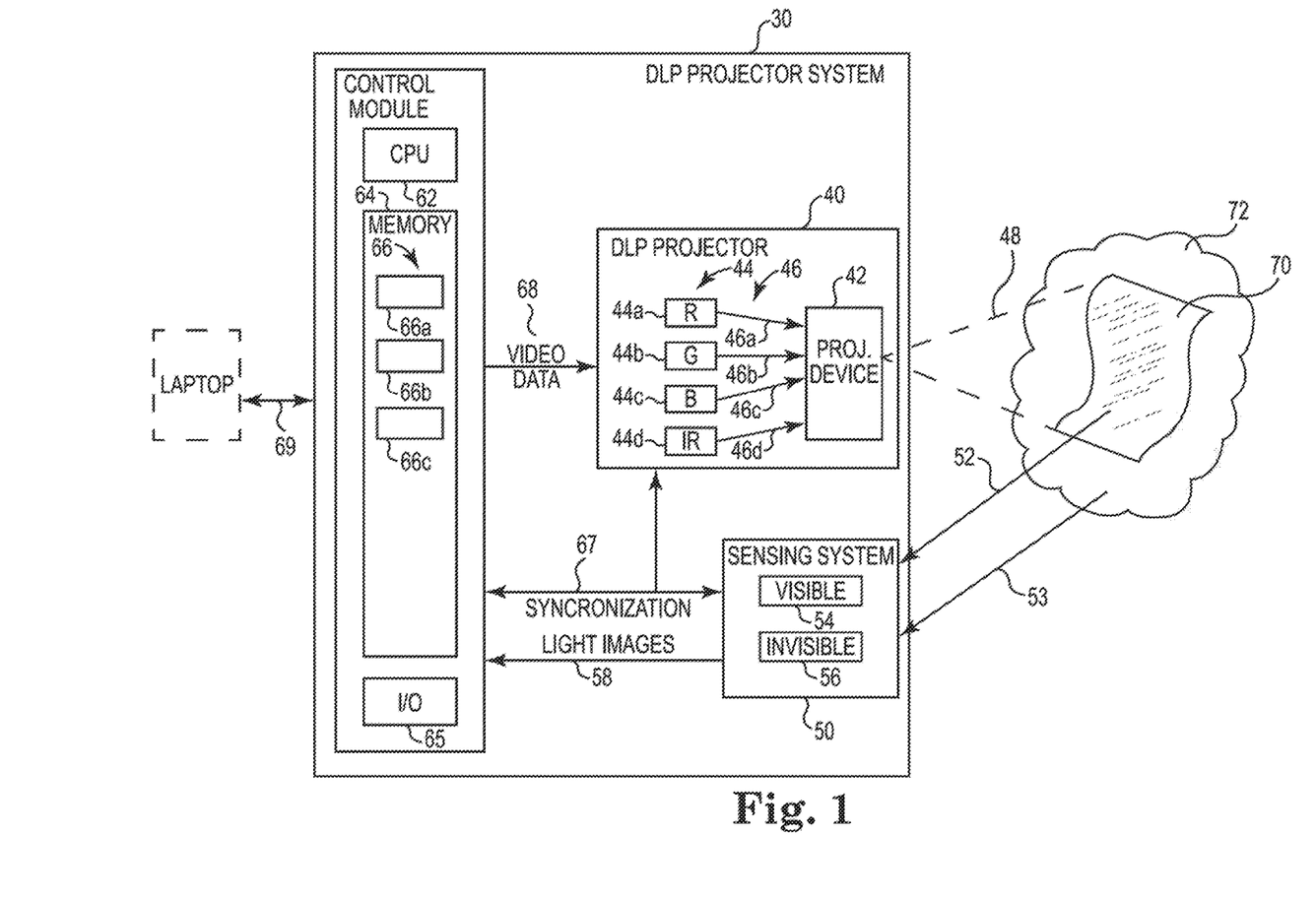
FIG. 1 a block and schematic diagram of a digital light projector system according to one example.

FIG. 1 is a block and schematic diagram of a digital light projector (DLP) system 30, in accordance with one example of the present disclosure, which integrates an invisible light source as an additional color channel in a multi-channel color DLP projector so that structured light patterns are projected by a same projecting device (e.g. a digital micro mirror device (DMD)) to provide 3D depth sensing and 3D object scanning using visible and/or light without requiring a separate projecting devices for the visible and invisible color channels. In one example, as described later herein, DLP system 30 provides a 3D sensing enabled interactive projected display or user interface.

DLP projector system 30 includes a DLP 40, a sensing system 50, and a control module 60. DLP projector 40 includes a projecting device 42 and a plurality of color channels 44 providing light 46, with the plurality of light sources 44 including at least one color channel providing visible light sources, and at least one color channel providing invisible light. In one example, as illustrated by FIG. 1, DLP projector 40 is a 4-channel projector with the plurality of color channels 44 including first, second, and third color channels 44a, 44b, and 44c respectively providing red light 46a, green light 46b, and blue light 46c, and a fourth color channel 44d providing invisible light 46d, such as infrared light, for example.

In one example, the light sources employed by color channels 44a-44d are laser diodes (e.g. red, green, and blue laser diodes and an infrared laser diode). In one example, invisible color channel 44d provides infrared light having a wavelength in a range from 1 µm (near-infrared) to 1,000 µm (far-infrared). In one example, a particular wavelength of infrared light employed by invisible color channel 44d is selected so as to be a wavelength least likely to match and be contaminated by ambient infrared light from infrared sources in environment 72. In other examples, invisible color channel 44d may employ suitable invisible light sources other than infrared light.

Projecting device 42 receives and controllably directs light 46a-46d from the plurality of color channels 44 to project light 48 into an environment 72 (e.g. a video screen) which forms a video image 70 thereon. In one example, video image 70 includes both a visible image and an invisible image. In one example, projecting device 42 is a microelectromechanical system (MEMS) based digital micro-mirror device (DMD). In one example, DLP projector 40 includes one DMD for each of the four color channels 44a-44d. In other examples, projecting device 42 comprises other suitable light projecting devices, such as a rotating mirror or a liquid-crystal on silicon (LCoS) device, for example.

Sensing system 50 receives light, both visible and invisible, from environment 72, including reflected light 52 from projected image 70 and ambient light 53 present from other sources in environment 72, including both visible and invisible light, such as infrared light, for example. In one example, sensing system 50 includes at least one sensor 54 for receiving visible light from environment 72 and at least one sensor 56 for receiving invisible light from environment 72. In one example, sensor 54 is a visible light camera configured to receive visible light from environment 72 to form a visible light image, and sensor 56 is an invisible light camera, such as an infrared camera, configured to receive invisible light from environment 72 (e.g. infrared light) to form an invisible light image. In one example, sensor 56 is sensitive to whatever wavelength of invisible light is being provided by invisible color channel 44*d*. In one example, as indicated at 58, the visible and invisible light images which are captured by sensing system 50 are provided to control module 60.

In other examples, more than one sensor 54 for receiving visible light and more than one sensor 56 for receiving invisible light are used, with the sensors being offset at different positions from projected light output 48 to receive visible and invisible light at different perspectives from one another and from projected light output 48. In one example, sensing system 50 includes a single broadband sensor for detecting both visible and invisible light, with the visible and invisible light data detected by the broadband sensor being provided as separate color channels to control module 60.

Control module 60, according to one example, includes a processing unit 62 and a memory 64, with memory 64 including one or more modules 66 having executable instructions for performing various functions, which are described in greater detail below. For instance, in one example, memory 64 includes a projection data module (PDM) 66*a* for providing video projection data 68 to DLP projector 40 for projection thereby, a depth data extraction module 66*b* for analyzing image data 58 received from sensing system 50, and a synchronization module 66*c* sending/receiving synchronization information for synchronizing visible and invisible light sensors 54 and 54 with image frames of video image 70 formed by light output 48 of DLP projector 40. In one example, control module 60 includes an input/output (I/O) module 65 for receiving input data (e.g. RGB video) and sending output data (e.g. scanned images, as described below) from/to external devices, such as a laptop, for example, as indicated at 69.

Figure 2:
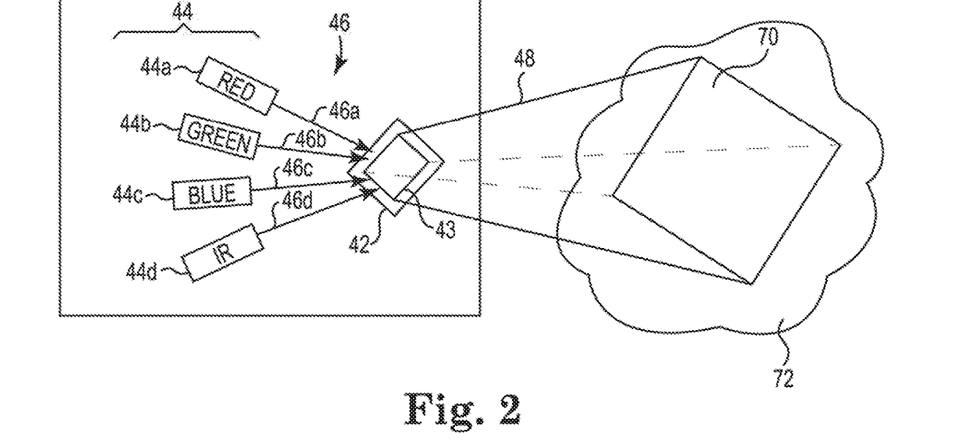
FIG. 2 is block and schematic diagram of a digital projector according to one example.

FIG. 2 is a block and schematic diagram generally illustrating DLP projector 40, according to one example, where projecting device 42 is a MEMS-based DMD 42 having an array of micromirrors 43. DMD 42 receives light 46*a*-46*b* from the plurality of 4-color channels 44, and controllably directs light 48 in the form of an array of pixels onto environment 72 to form video image 70. In one example, each micromirror of the array of micromirrors 43 corresponds to and forms one pixel of video image 70.

Video image 70 is formed by a series of image frames, with each image frame formed by the array of pixels projected by DMD 42. In one example, to form the each pixel of each frame, DMD 42, via control of the individual mirrors of the array of micromirrors 43, sequentially projects a series of light pulses from light 46*a*-46*d* from each of the color channels 44*a*-44*d*. According to one example, video image 70 includes a visible image and an invisible image, with light pulses from visible color channels 46*a*-46*c* forming the visible image, and light pulses from invisible color channel 46*d* forming the invisible image.

In a DLP projector, such as a conventional 3-color channel DLP projector with red, green, and blue color channels, each pixel in an image or image frame has intensity values for the red, green, and blue components that together form the pixel. To achieve the intensity values for each component, each of the mirrors of the array of micromirrors 43 of DMD 42 are controlled to rapidly turn on and off (i.e. turned toward or away from the projection environment 72) to create light pulses which together form the desired intensity. The process of rapidly controlling the on/off state of the micromirrors is sometimes referred to as a pulse sequence or mirror flip sequence.

Figure 3:
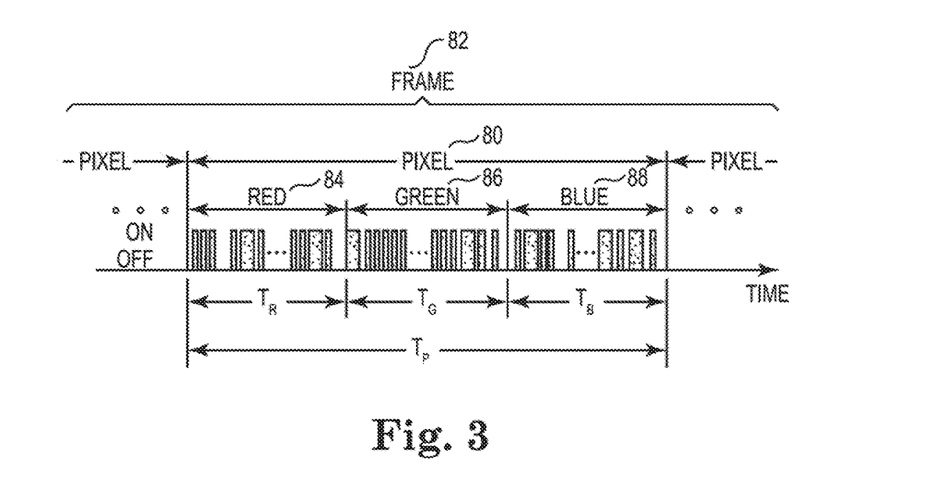
FIG. 3 is an example of a pulse sequence for a conventional digital light projector.

FIG. 3 generally illustrates an example a pulse sequence for a pixel 80 of a sequence of pixels forming a frame 82 of a video image for a conventional 3-color channel (e.g. red-green-blue) DLP projector, with the horizontal axis representing time. In the example of FIG. 3, pulse sequence 80 includes one segment for each color channel, with a segment 84 for the red color channel, a segment 86 for the green color channel, and a segment 88 for the blue color channel. Pulse sequence 80 has a duration $T_P$, with the red, green, and blue segments respectively having durations indicated as $T_R$, $T_G$, and $T_B$. In a conventional 60 Hz projector, pulse sequence 80 has a duration, $T_P$, of approximately 16.7 milliseconds, for example. While the durations for each of the color channel segments 84, 86, and 88 are illustrated as being approximately equal, in other examples, each of the color channels segments 84, 86, and 88 may have different durations. For instance, in one example, $T_G$ may be greater than $T_B$ and $T_B$ may be greater than $T_R$.

In FIG. 3, each of the dark regions or pulses represents a light pulse being generated by the DLP projector indicating that the corresponding mirror for the pixel being formed by pulse sequence 80 is in the "on" position (i.e. tilted toward the projection environment, such as projection environment 72. The "light" or unshaded regions represent the mirror being in the "off" position (i.e. tilted away from the projection environment). The intensity of the color required to be generated determines the "on" and "off" times of the color pulses. For example, for a pixel having a red color intensity of 128 out of 256, for instance, the mirror or light pulses may be "on" about 50% of the duration $T_R$ of red segment 84.

Figure 4:
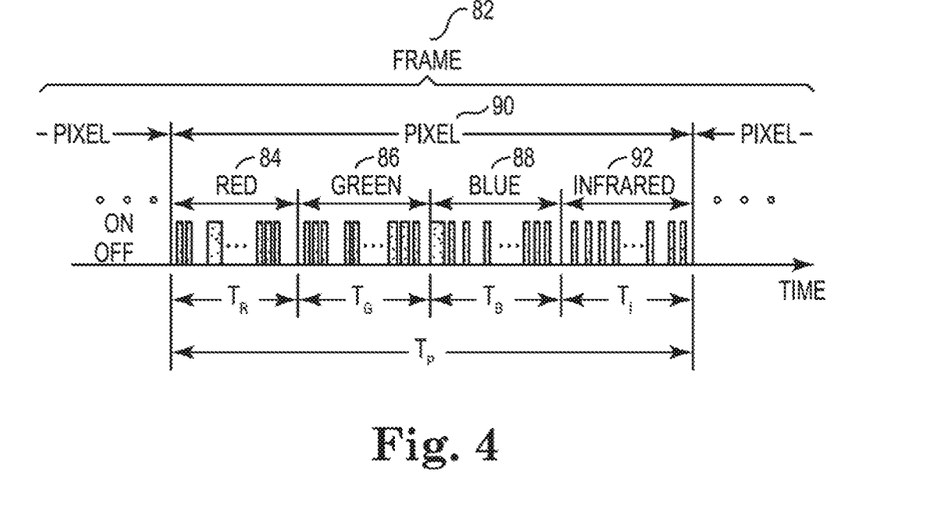
FIG. 4 is a pulse sequence for a digital light projector according to one example.

FIG. 4 generally illustrates an example of pulse sequence 90 as employed by DLP projector 40 in accordance with one example of the present disclosure. The example pulse sequence 90 represents an implementation of DLP projector 40 having 4-channels including first, second, and third color channels 44*a*, 44*b*, and 44*c* respectively providing red, green, and blue light, and fourth color channel 44*d* providing infrared light, such as illustrated by FIG. 1. Pulse sequence 90 for DLP projector 40 is similar to pulse sequence 80 for a conventional 3-channel DLP projector, except that in addition to segments 84, 86, and 88 for red, green, and blue light pulses, pulse sequence 90 further includes a segment 92 for infrared light pulses.

Similar to pixel pulse sequence 80, pixel pulse sequence 90 has a duration $T_P$, with the red, green, blue, and infrared segments 84, 86, 88, and 92 respectively having durations indicated as $T_R$, $T_G$, $T_B$, and $T_I$. As before, using a 60 Hz projection frequency, pixel pulse sequence 90 has a duration, $T_P$, of approximately 16.7 milliseconds, for example. Similarly, while the durations for each of the color channel segments 84, 86, 88, and 92 are illustrated as being approximately equal, in other examples, each of the color channels segments 84, 86, 88, and 92 may have different durations.

Figure 5:
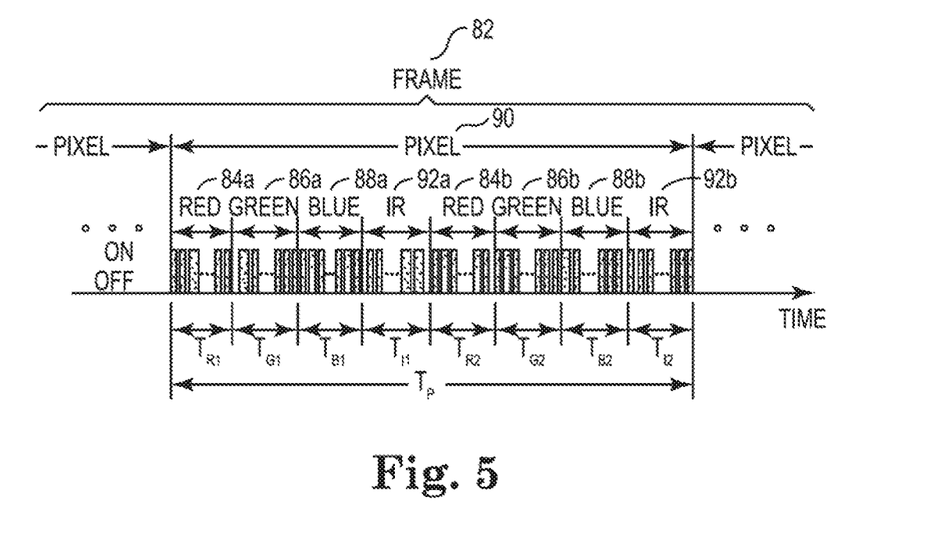
FIG. 5 is a pulse sequence for a digital light projector according to one example.

FIG. 5 generally illustrates another example of pulse sequence 90 for DLP projector 40 in accordance with one example of the present disclosure. According to the example of FIG. 5, in lieu of employing a single segment for each color channel, each of the segments are divided into sub-segments, with red color channel 44a having first and second pulse sub-segments 84a and 84b, green color channel 44b having first and second pulse sub-segments 86a and 86b, blue color channel 44c having first and second pulse sub-segments 88a and 88b, and infrared color channel 44d having first and second pulse sub-segments 92a and 92b. The sub-segments for each color channel may have different durations, for example, durations $T_{R1}$ and $T_{R2}$ for sub-segments 84a and 84b for red color channel 44a may have different durations. Again, the four color channels may also have different total durations. For example, the combined durations $T_{B1}$ and $T_{B2}$ of pulse sub-segments 88a and 88b of blue color channel 44c may be different than the combined durations of $T_{G1}$ and $T_{G2}$ of pulse sub-segments 86a and 86b of green color channel 44b.

By integrating an invisible color channel as an additional channel in a multi-channel color DLP projector, and by interleaving the projection of invisible light with the visible light of each pixel, a DLP projector according to examples of the present disclosure (such as 4-color DLP projector 40 having red, green, blue, and infrared colors channels as described above) is able to project a video image, such as video image 70, having both a visible image and an invisible image with one projecting device (such as DMD projecting device 42) and does not require separate projecting devices for visible and invisible light channels. DLP projection system 30, according to the present disclosure is able to user interactive projected displays or user interfaces, and can perform 3D depth scanning and 3D object scanning via visible and or non-visible wavelengths.

Figure 6:
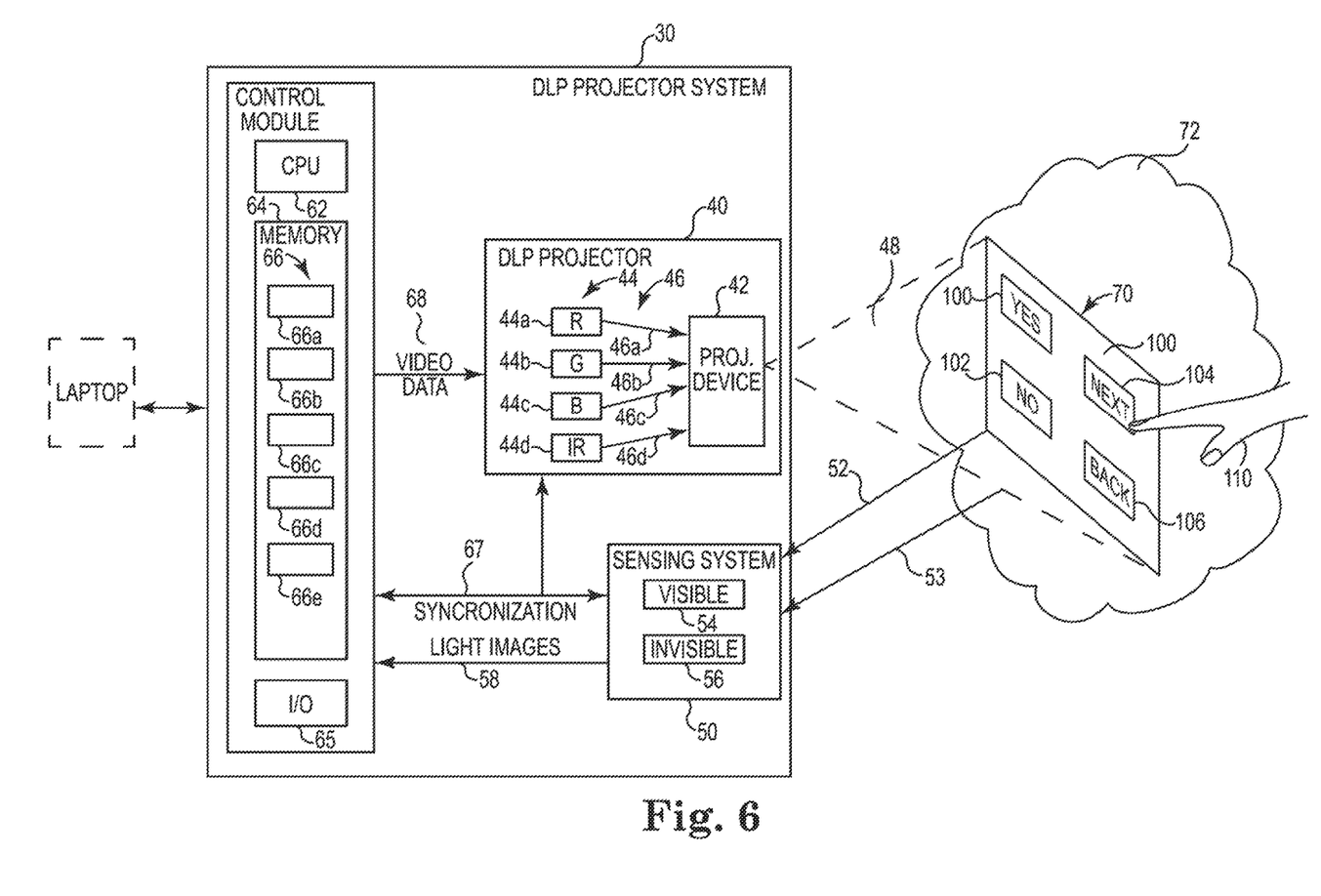
FIG. 6 is a block and schematic diagram of a digital light projector system according to one example.

FIG. 6 is a block and schematic diagram illustrating an example of DLP system 30, according to the present disclosure, providing a 3D sensing enabled interactive user interface. In one example, DLP projector 40 projects a video image 70 onto environment 70, such as a screen or a surface of a desk, for example, wherein visible light (e.g. red, green, blue) from visible color channels 44a-44c forms a visible image portion representing a user display or interface 100 including a plurality of icons, such as icons 102, 104, 106, and 108, and wherein infrared light from invisible light channel 44d is forms an invisible structured light pattern. As described below, a user 100, as illustrated by a hand in FIG. 6, is able to interact with projected user interface 100 (e.g. graphical user interface (GUI)).

Visible light camera 54 and infrared camera 56 of sensing system 50 respectively obtain visible and infrared light images (i.e. a structured infrared light pattern in this example) from video image 70, of user 110, and environment 72 in the vicinity of video image 70. Visible light camera 54 and infrared camera 56 may obtain images of individual frames of video image 70 and/or a series of successive frames of video image 70, with visible and infrared light cameras 54 and 56 being synchronized with projected video image 70 by synchronizing information 67 from synchronizing module 66c. The visible and invisible light images obtained by sensing system 50 are provided to control module 60 at 58.

In one example, depth extraction module 66b receives invisible light images of the structured infrared light pattern projected onto environment 72, as obtained by infrared camera 56, and employs structured light pattern techniques to obtain depth information of environment 72 based on deformation of the structured light pattern. In one example, a 3D data module 66d merges or texture maps, or otherwise combines, depth data obtained from invisible light images with visible light images obtained by visible light camera 54, to form a 3D map of environment 72, including user interface 100 and user 110.

It is noted that ambient light 53, both visible and infrared, from sources in environment 72 can contaminate the visible and invisible light images obtained by visible and infrared cameras 54 and 56. In one example, control module 60, such as via depth extraction module 66b and 3D data module 66c, accounts for such light contamination by comparing visible and infrared light images obtained by visible and infrared cameras 54 and 56 before projection of video image 70 to visible and infrared light images obtained after projection of video image 70 and subtracting the ambient light.

In one example, an object recognition module 66e processes information from the 3D map formed by 3D data module 66d to identify objects within environment 72, including gestures made by user 110. Such identification can be done using any one of a number of suitable algorithms such as gesture recognition algorithms, facial recognition algorithms, object recognition algorithms, and object tracking algorithms, for example. In one example, based on recognition of a gesture by user 100 (e.g. pointing or tapping, for example) and the positioning of such gesture relative to user interface 100, such as over icon 104, for example, identification of a user input can be determined, such as selection of icon 104. In one example, based on the identification of such user input, control module 64, such as via projection data module 66a, modifies the projected image 70 to reflect the user input (e.g. proceed to the next screen of the user interface 100).

By projecting a user interface 100 using the visible color channels 44a-44c, and by projecting an structure infrared light pattern using infrared color channel 44d from which depth data is determined, DLP projector system 30 provides an interactive projected user interface with a single DLP projector employing a single projecting device 42 (e.g. DMD 42).

Figure 7:
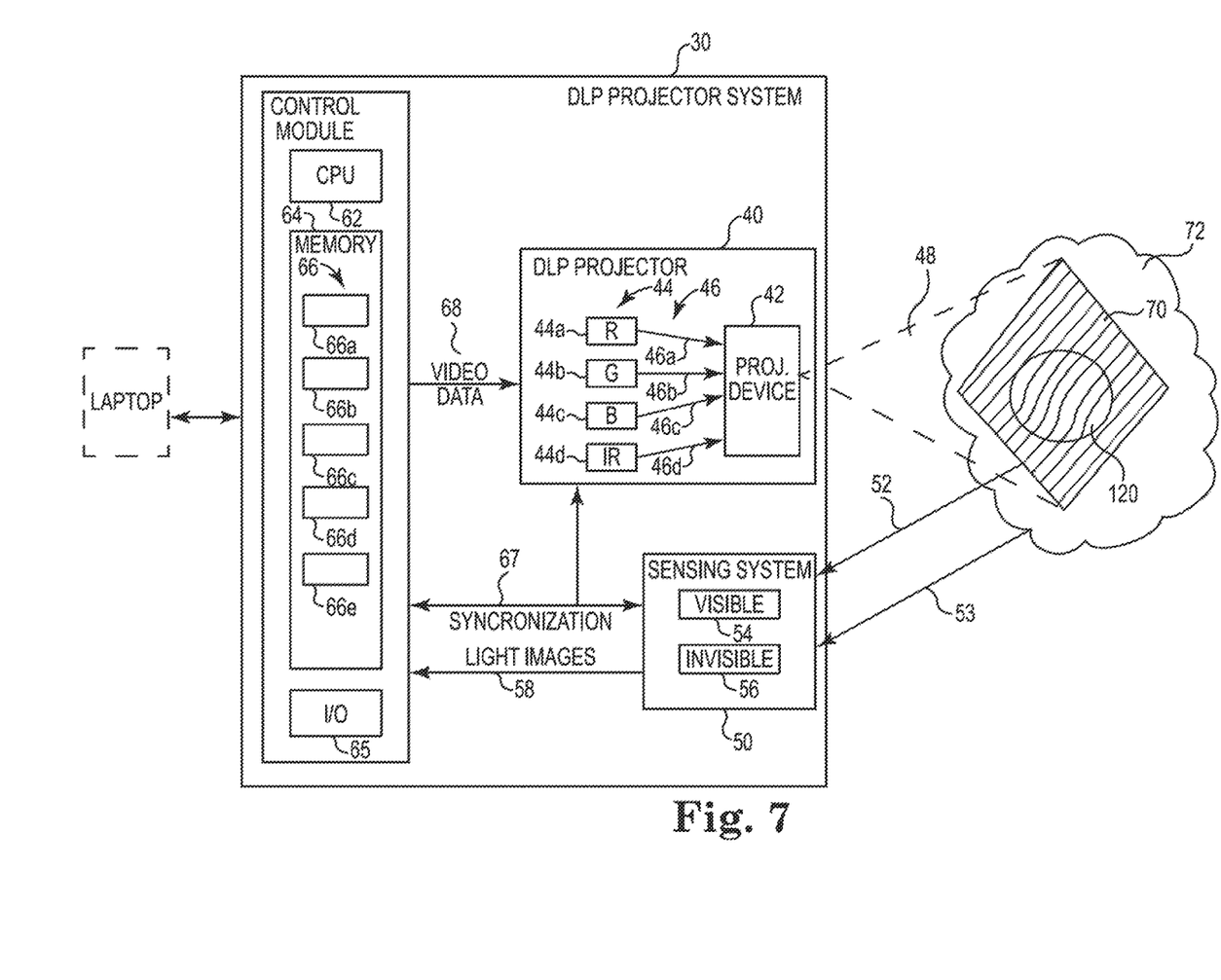
FIG. 7 is a block and schematic diagram of a digital light projector system according to one example.

FIG. 7 is a block and schematic diagram illustrating an example of DLP system 30, according to the present disclosure, providing 3D object scanning using visible and/or invisible light structured light patterns. In one example, an object, such as a ball 120, is placed in a field of view of DLP projector system 30. In one example, DLP projector 40, via DMD 42, projects a video image 70 onto the object(s) to be scanned, such as ball 120, wherein visible light (e.g. red, green, blue) from visible color channels 44a-44c forms a visible structured light pattern (e.g. vertical stripes), and invisible light (e.g. infrared) from invisible color channel 44d forms an invisible structured light pattern)). In one example, a different visible structured light pattern having a different orientation is projected for each of the visible color channels 44a-44c.

Visible and invisible cameras 54 and 56 of sensing system 50 respectively capture one or more images of the visible structured light pattern(s) and the structured infrared light pattern. Visible light camera 54 and infrared camera 56 may obtain images of individual frames of video image 70 and/or a series of successive frames of video image 70, with visible and infrared light cameras 54 and 56 being synchronized with projected video image 70 by synchronizing information 67 from synchronizing module 66c. The visible and invisible light images obtained by sensing system 50 are provided to control module 60 at 58.

In one embodiment, depth extraction module 66b receives the images of the visible and invisible structured light patterns from sensing system 50, and employs structured light pattern techniques to extract depth information for the scanned object (e.g. ball 120). By employing by visible and invisible structured light patterns for depth mapping purposes, more accurate depth data may be obtained than by using either a visible or an invisible structured light pattern alone.

In one example, based on the depth data extracted from the structured visible and invisible light patterns, 3D data module 66*d* constructs a 3D image of the scanned object (e.g. ball 120). In one example, 3D data module 66*d* merges or texture maps, or otherwise combines, depth data from depth extraction module 66*b* with the visible light images obtained by visible light camera 54, to form a 3D color image of the scanned object.

In other embodiments, rather than using both visible and invisible structured light patterns, 3D scanning may be performed by using only structured invisible light patterns or only structured visible light patterns. A such, by integrating a fourth, invisible color channel in DLP projector 40, DLP projector system 30 according to the present disclosure provides 3D depth sensing and 3D object scanning using visible and/or invisible light without requiring a separate projecting devices for the visible and invisible color channels.

Figure 8:
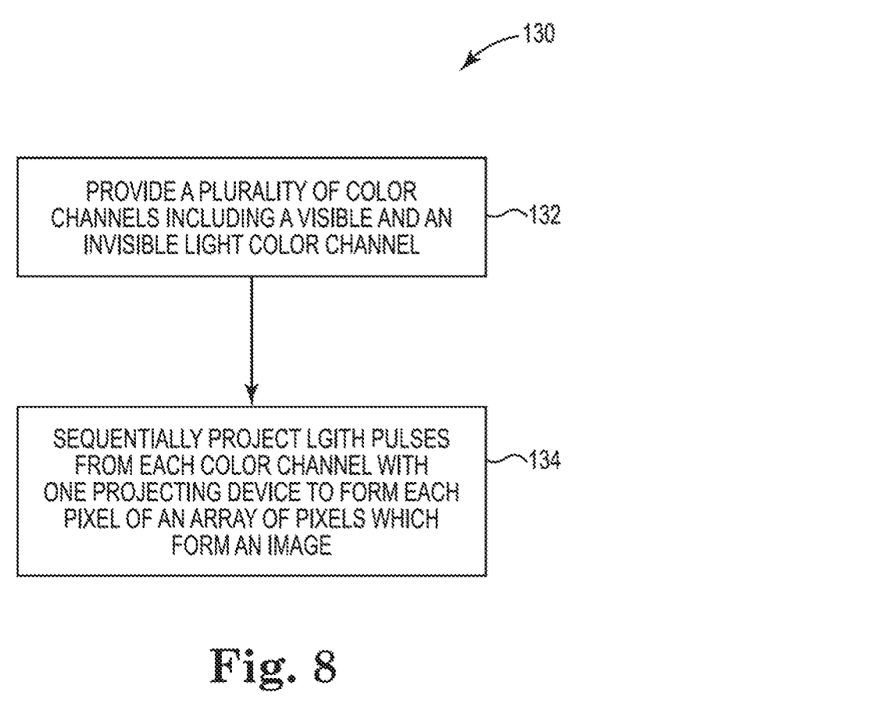
FIG. 8 is a flow diagram illustrating a method of operating a digital light projector system according to one example.

FIG. 8 is a flow diagram illustrating one example of a method 130 of operating a DLP projector employing an invisible light color channel according to the present disclosure. At 132, method 130 includes providing a plurality of color channels, such as color channels 44, including at least one visible color channel providing visible light and at least one invisible color channel providing invisible light. At 134, method 130 includes sequentially projecting a series of light pulses from light provided by each of the plurality of color channels with one projecting device, such as projecting device 42 (e.g. a DMD device) to form each pixel of an array of pixels projected onto an environment, wherein the array of pixels together form an image, with light pulses from the at least one visible color channel forming a visible portion of the image and light pulses form the at least one invisible color channel forming an invisible portion of the image.

Although not illustrated, in one example, providing a plurality of color channels at 132 includes providing three visible color channels; a first color channel providing red light, a second color channel providing green light, and providing a third color channel providing blue light, and providing a fourth color channel providing infrared light. In one example, sequentially projecting a series of light pulses from light provided by each of the plurality of color channels, at 134, includes providing to the one projecting device a pulse sequence for each pixel having a pulse segment for each of the plurality of color channels, including the at least one invisible color channel, such as illustrated by the pulse sequence of FIG. 4, for example. In one example, forming the invisible image at 134 includes forming a structured light pattern with light pulses from the at least one invisible color channel.

In one example, forming the visible portion of the image includes forming a graphical user interface, with method 130 further including: extracting three-dimensional depth data from the environment based at least on the structured light pattern formed light pulses from the at least one invisible color channel; identifying user interaction with the graphical user interface projected onto the environment by the one projecting device; and changing the graphical user interface projected onto the environment based on the identified user interaction, such as illustrated by the example of FIG. 6, for instance.

In one example, wherein forming the visible portion of the image comprises forming a structured light pattern, method 130 further includes performing 3D depth scanning and 3D object scanning of an object in the environment onto which the visible and invisible structured light patterns are projected based on at least one of the visible structured light pattern and the invisible structured light pattern, such as illustrated by FIG. 7, for example.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore it is intended that this disclosure be limited only by the claims and the equivalents thereof.

The invention claimed is:

1. A digital light projector comprising:
a plurality of color channels including at least one visible color channel to provide visible light and at least one invisible color channel to provide invisible light; and
a projecting device to provide light from the plurality of color channels onto an environment in the form of an array of pixels which together form a video image including a visible image and an invisible image, the video image comprising a series of frames with each frame formed by the array of pixels,
wherein to form a pixel of the array of pixels of a frame of the series of frames, the projecting device is to sequentially project a series of light pulses from light provided by respective color channels of the plurality of color channels, with light pulses from the at least one visible color channel forming the visible image and light pulses from the at least one invisible color channel forming the invisible image.

2. The digital light projector of claim 1, wherein the plurality of color channels includes a first channel to provide red light, a second channel to provide green light, a third color channel to provide blue light, and a fourth color channel to provide invisible light.

3. The digital light projector of claim 1, wherein the invisible color channel is to provide infrared light.

4. The digital light projector of claim 1, wherein the projecting device comprises a microelectomechanical system based digital micromirror device.

5. The digital light projector of claim 1, wherein the invisible image comprises a structured light pattern to enable the digital light projector to perform 3D depth sensing and 3D object scanning using invisible light.

6. The digital light projector of claim 5, wherein the visible image comprises a graphical image.

7. The digital light projector of claim 5, wherein the visible image comprises a structured light pattern to enable the digital light projector to perform 3D depth sensing and 3D object scanning using visible light and/or invisible light.

8. A method of operating a digital light projector comprising:
providing a plurality of color channels including at least one visible color channel providing visible light and at least one invisible color channel providing invisible light;
sequentially projecting a series of light pulses from light provided by each of the plurality of color channels with one projecting device to form each pixel of an array of pixels projected onto an environment, wherein the array of pixels together form an image, with light pulses from the at least one visible color channel forming a visible portion of the image and light pulses form the at least one invisible color channel forming an invisible portion of the image.

9. The method of claim 8, wherein providing the at least one visible color channel includes providing a first color channel providing red light, a second color channel providing green light, and providing a third color channel providing blue light, and wherein providing the at least one invisible color channel includes providing a fourth color channel providing infrared light.

10. The method of claim 8, wherein sequentially projecting the series of light pulses from light provided by each of the plurality of color channels includes providing to the one projecting device a pulse sequence for each pixel having a pulse segment for each of the plurality of color channels including the at least one invisible color channel.

11. The method of claim 8, wherein forming the invisible portion of the image comprises forming a structured light pattern with light pulses from the at least one invisible color channel.

12. The method of claim 11, wherein forming the visible portion of the image comprises forming a graphical user interface, wherein the method further includes:
extracting three-dimensional depth data from the environment based at least on the structured light pattern formed with the light pulses from the at least one invisible color channel;
identifying user interaction with the graphical user interface projected onto the environment by the one projecting device; and
changing the graphical user interface projected onto the environment based on the identified user interaction.

13. The method of claim 11, wherein forming the visible portion of the image comprises forming a structured light pattern, the method further comprising:
performing 3D depth scanning and 3D object scanning of an object in the environment onto which the visible and invisible structured light patterns are projected based on at least one of the visible structured light pattern and the invisible structured light pattern.

14. A digital light projector system comprising:
a digital light projector comprising:
a plurality of color channels including at least one visible color channel to provide visible light and at least one invisible color channel to provide invisible light; and
a projecting device to project light from the plurality of color channels onto an environment in the form of an array of pixels which together form a video image including a visible image and an invisible image, the video image comprising a series of frames with each frame formed by the array of pixels, wherein to form a pixel of the plurality of pixels of a frame of the series of frames, the projecting device is to sequentially project a series of light pulses from light provided by respective color channels of the plurality of color channels, with light pulses from the at least one visible color channel forming the visible image and light pulses from the at least one invisible color channel forming the invisible image;
a sensing system including at least one sensor for sensing visible light and at least one sensor for sensing the invisible light provided by the at least one invisible color channel; and
a controller configured to extract three-dimensional depth data from the environment based at least on sensed invisible light from the at least one sensor sensing invisible light.

15. The digital light projector of claim 1, wherein the series of light pulses for the pixel form a pulse sequence comprising a plurality of segments, a first segment of the plurality of segments comprising light pulses from the visible color channel to form the pixel, and a second segment of the plurality of segments comprising light pulses from the invisible color channel to form the pixel.

16. The digital light projector of claim 15, wherein the pulse sequence has a time duration, the first segment has a first time duration, and the second segment has a second time duration, each of the first and second time durations shorter than the time duration of the pulse sequence.

17. The digital light projector of claim 1, wherein the series of light pulses for the pixel comprises a light pulse from the invisible color channel interleaved with light pulses from visible color channels.

18. The method of claim 8, wherein the series of light pulses for each pixel comprises a light pulse from the invisible color channel interleaved with light pulses from visible color channels.

19. The digital light projector system of claim 14, wherein the series of light pulses for the pixel form a pulse sequence comprising a plurality of segments, a first segment of the plurality of segments comprising light pulses from the visible color channel to form the pixel, and a second segment of the plurality of segments comprising light pulses from the invisible color channel to form the pixel, wherein the pulse sequence has a time duration, the first segment has a first time duration, and the second segment has a second time duration, and each of the first and second time durations is shorter than the time duration of the pulse sequence.

20. The digital light projector system of claim 14, wherein the series of light pulses for the pixel comprises a light pulse from the invisible color channel interleaved with light pulses from visible color channels.

* * * * *

UNITED STATES PATENT AND TRADEMARK OFFICE
CERTIFICATE OF CORRECTION

PATENT NO. : 10,216,075 B2
APPLICATION NO. : 15/511035
DATED : February 26, 2019
INVENTOR(S) : David Bradley Short et al.

It is certified that error appears in the above-identified patent and that said Letters Patent is hereby corrected as shown below:

In the Drawings

In sheet 6 of 6, reference numeral 134, Line 1, delete "LGITH" and insert -- LIGHT --, therefor.

In the Claims

In Column 8, Line 48, in Claim 4, delete "microelectomechanical" and insert -- microelectromechanical --, therefor.

Signed and Sealed this
Twenty-fifth Day of June, 2019

Andrei Iancu
*Director of the United States Patent and Trademark Office*